US010200245B2

(12) United States Patent
Edwards et al.

(10) Patent No.: US 10,200,245 B2
(45) Date of Patent: Feb. 5, 2019

(54) ADJUSTABLE DATA RATES

(71) Applicant: Cisco Technology, Inc., San Jose, CA (US)

(72) Inventors: William Frank Edwards, Livermore, CA (US); Keith Frank Tharp, San Jose, CA (US); Ken Naumann, Livermore, CA (US); Amrik Bains, Livermore, CA (US); Clark Carty, Brunswick, CA (US); Alan Yee, Los Gatos, CA (US); Arvind Kansal, Cupertino, CA (US); Samir Bouadjel, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 15/075,160

(22) Filed: Mar. 20, 2016

(65) Prior Publication Data

US 2016/0204950 A1    Jul. 14, 2016

Related U.S. Application Data

(62) Division of application No. 14/273,681, filed on May 9, 2014, now Pat. No. 9,294,355.

(Continued)

(51) Int. Cl.
*H04L 12/10* (2006.01)
*H04L 29/08* (2006.01)
(Continued)

(52) U.S. Cl.
CPC ............ *H04L 41/083* (2013.01); *G06F 13/40* (2013.01); *H04L 1/002* (2013.01); *H04L 5/1446* (2013.01);
(Continued)

(58) Field of Classification Search
USPC .............................................. 307/1
See application file for complete search history.

(56) References Cited

U.S. PATENT DOCUMENTS 7,000,031 B2    2/2006  Fischer et al.
7,977,951 B1    7/2011  Lo et al.
(Continued)

FOREIGN PATENT DOCUMENTS

WO    2007140467 A2    12/2007
WO    2011103070 A1     8/2011

OTHER PUBLICATIONS

Copending U.S. Appl. No. 14/297,681, filed Jun. 6, 2014 entitled "ICM Foot-Print with UPOE Support".

(Continued)

*Primary Examiner* — Rexford Barnie
*Assistant Examiner* — Xuan Ly
(74) *Attorney, Agent, or Firm* — Merchant & Gould P.C.

(57) ABSTRACT

Adjustable data rate data communications may be provided. First, a plurality of remote data rates at which a remote device is configured to operate may be received. Then, a plurality of local data rates at which a local device is configured to operate may be received. A greatest one of the plurality of local data rates may comprise a cable data rate comprising a greatest rate supported by a length of cable connecting the local device and the remote device. Next, an operating data rate may be determined. The operating data rate may comprise a highest one of the plurality of local data rates that has a corresponding equivalent within the plurality of remote data rates. The local device may then be operated at the operating data rate.

17 Claims, 5 Drawing Sheets

Related U.S. Application Data

(60) Provisional application No. 61/916,390, filed on Dec. 16, 2013.

(51) Int. Cl.
*H04L 12/24* (2006.01)
*G06F 13/40* (2006.01)
*H04L 1/00* (2006.01)
*H04L 5/14* (2006.01)
*H04L 12/40* (2006.01)
*H04L 12/931* (2013.01)
*H04L 12/935* (2013.01)

(52) U.S. Cl.
CPC .......... *H04L 12/10* (2013.01); *H04L 12/4013* (2013.01); *H04L 49/40* (2013.01); *H04L 49/3054* (2013.01); *H04L 69/323* (2013.01)

(56) References Cited

U.S. PATENT DOCUMENTS

| | | | |
|---|---|---|---|
| 8,295,163 | B1 | 10/2012 | Schmalz et al. |
| 8,370,701 | B2 | 2/2013 | Diab et al. |
| 9,026,809 | B2* | 5/2015 | Paul .................... H04L 12/10 713/300 |
| 9,294,355 | B2 | 3/2016 | Edwards et al. |
| 9,577,887 | B2 | 2/2017 | Edwards et al. |
| 2005/0024026 | A1 | 2/2005 | Hung et al. |
| 2005/0078700 | A1 | 4/2005 | Thompson et al. |
| 2007/0041577 | A1 | 2/2007 | Ghoshal et al. |
| 2007/0082550 | A1 | 4/2007 | Hemmah et al. |
| 2007/0192505 | A1 | 8/2007 | Dalmia |
| 2007/0208961 | A1 | 9/2007 | Ghoshal et al. |
| 2007/0263707 | A1 | 11/2007 | Theodoras, II |
| 2009/0051410 | A1* | 2/2009 | Hussain .................. G06F 1/266 327/524 |
| 2009/0063874 | A1* | 3/2009 | Diab ....................... G06F 1/266 713/300 |
| 2009/0097442 | A1 | 4/2009 | Diab et al. |
| 2010/0178054 | A1 | 7/2010 | Cain |
| 2011/0302401 | A1* | 12/2011 | Yokoyama ............ G06F 1/3209 713/2 |
| 2012/0301134 | A1 | 11/2012 | Davari et al. |
| 2015/0172110 | A1 | 6/2015 | Edwards et al. |
| 2015/0172221 | A1 | 6/2015 | Edwards et al. |

OTHER PUBLICATIONS

International Search Report dated Mar. 31, 2015 cited in Application No. PCT/US2014/070643, 14 pgs.
International Search Report dated Apr. 20, 2015 cited in Application No. PCT/US2014/070635, 6 pgs.
International Search Report dated Dec. 17, 2015 cited in Application No. PCT/US2014/070635, 18 pgs.
U.S. Office Action dated Mar. 25, 2016 cited in U.S. Appl. No. 14/297,681, 43 pgs.
U.S. Notice of Allowance dated Oct. 13, 2016 cited in U.S. Appl. No. 14/297,681, 23 pgs.

* cited by examiner

ADJUSTABLE DATA RATES

RELATED APPLICATION

This application is a Division of U.S. application Ser. No. 14/273,681 filed May 9, 2014, now U.S. Pat. No. 9,294,355 entitled "Adjustable Data Rates", which is incorporated herein by reference, which claims the benefit under the provisions of 35 U.S.C. § 119(e) of U.S. Provisional Application No. 61/916,390 filed Dec. 16, 2013, which is also incorporated herein by reference.

TECHNICAL FIELD

The present disclosure relates generally to data communications.

BACKGROUND

The Ethernet physical layer is the physical layer component of the Ethernet family of computer network standards. The Ethernet physical layer evolved over a considerable time span and encompasses quite a few physical media interfaces and several magnitudes of speed. The speed ranges from 1 Mbit/s to 100 Gbit/s, while the physical medium can range from coaxial cable to twisted pair and optical fiber. In general, network protocol stack software will work similarly on all physical layers.

Power Over Ethernet (POE) is a standardized system to provide electrical power along with data on Ethernet cabling. This allows a single cable to provide both data connection and electrical power to such devices as network hubs or closed-circuit TV cameras. Unlike standards such as Universal Serial Bus (USB) that also powers devices over data cables, POE allows long cable lengths.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
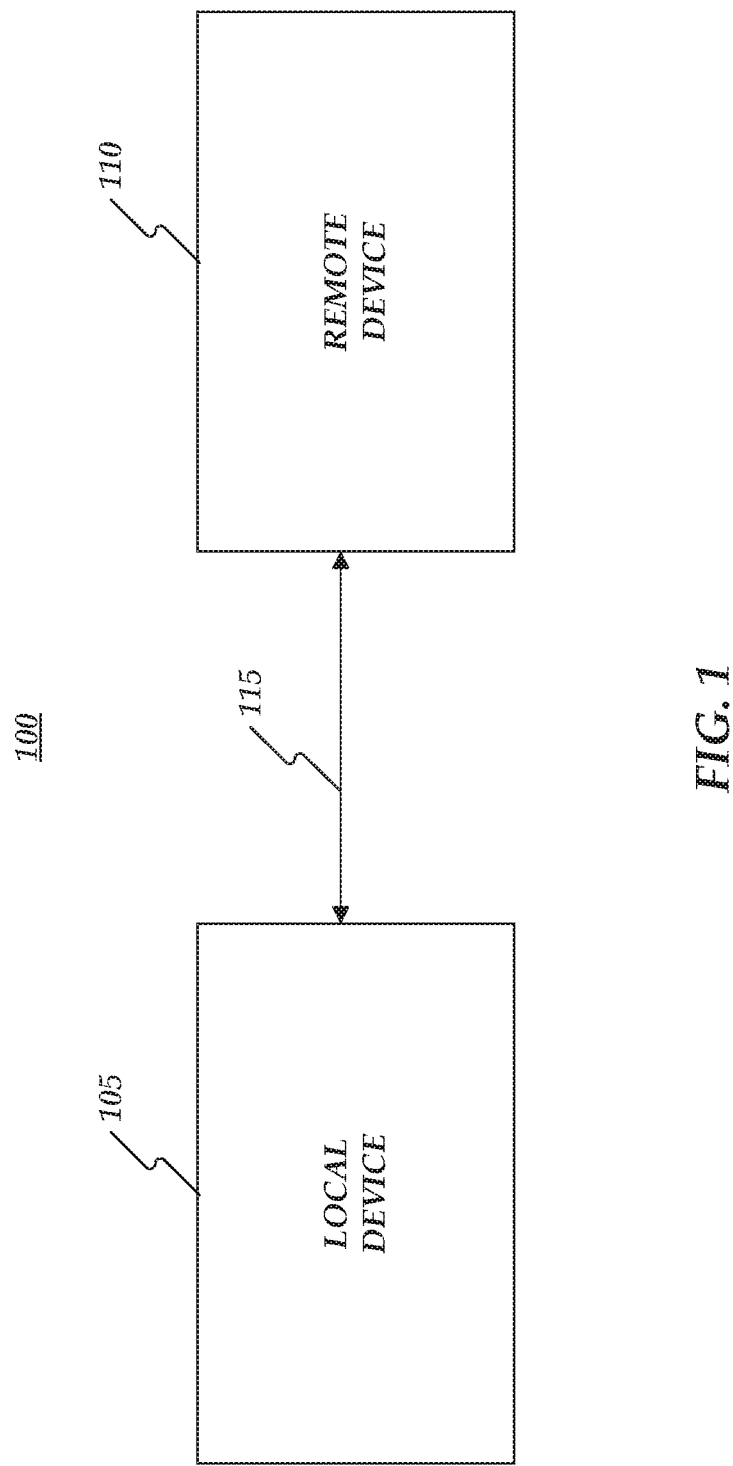
FIG. 1 is a block diagram of a communications system.

Adjustable data rate data communications may be provided. First, a plurality of remote data rates at which a remote device is configured to operate may be received. Then, a plurality of local data rates at which a local device is configured to operate may be received. A greatest one of the plurality of local data rates may comprise a cable data rate comprising a greatest rate supported by a length of cable connecting the local device and the remote device. Next, an operating data rate may be determined. The operating data rate may comprise a highest one of the plurality of local data rates that has a corresponding equivalent within the plurality of remote data rates. The local device may then be operated at the operating data rate.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Current cabling infrastructures provide data communications over networks such as Ethernet networks. Many of the current cabling infrastructures use Category 5e copper cables that may not support 10G Ethernet data rates at 100 m cable length for example. Category 5e cables, however, may support up to 55 m cable lengths at 10 GE, while Category 6A cable may support 100 m cable lengths. Category 5e cable may be limited at 10GE due to bandwidth and insertion loss of the cable. For example, 10G-BASE-T using 16 PAM may need 400 MHz bandwidth (e.g., 800 Msymbol/sec per pair). While Category 5e may be specified to 100 MHz bandwidth, cable characterization measurement may shows Category 5e may support 200 MHz and 400 Msymbol/sec. With 400 Msymbol/sec, Category 5e may support 5GE using standard 10GBASE-T coding.

Embodiments of the disclosure may, for example, modify a 10G physical layer (PHY) circuit to support any data rate between 10M to 10G using 802.3 10GE constellation/coding and adding new speed support in auto-neg messages. The new scheme, consistent with embodiments of the disclosure, may use 10G training to establish a data rate speed using new auto-neg messages and may dynamically adjust a reference clock to the negotiated data rate. Adjusting the reference clock to support 2.5G and 5G, for example, may results in reducing bandwidth to 100 MHz/200 MHz respectively. Consequently, embodiments of the disclosure may provide data rates such as 2.5G and 5G over 100 m of Category 5e cable. With conventional systems, the bandwidth required would be the same as 10GE. In other words, for cable lengths between up to 100 m, embodiments of the disclosure may provide data rates between 10M and 10G (e.g., 2.5G and 5G) and may not limit the data rates to 1G. Furthermore, embodiments of the disclosure may perform data auto-negotiation between, for example, CPU/ASIC via messages while maintaining the same clock to match data rates.

FIG. 1 shows a communications system 100. As shown in FIG. 1, communications system 100 may comprise a local device 105 and a remote device 110. Local device 105 and remote device 110 may comprise, but are not limited to, networking devices such as routers, switches, access points, or any type of devices used in a network. Consistent with embodiments of the disclosure local device 105 may supply power to remote device 110. For example, local device 105 may comprise universal power over Ethernet (UPoE) power source equipment to power remote device 110 that may comprise a UPoE powered device. Local device 105 may operate at a plurality of local data rates at which local device 105 may be configured to operate. The plurality of local data rates may have an upper limit of as high as 100G and a lower limit as low as 10M. The aforementioned upper and lower limits are examples and may comprise any value. Remote device 110 may operate at a plurality of remote data rates at which remote device 110 may be configured to operate. The plurality of remote data rates may have an upper limit of as high as 100G and a lower limit as low as 10M. The aforementioned upper and lower limits are examples and may comprise any value.

Local device 105 and remote device 110 may be connected via a cable 115 as shown in FIG. 1. Cable 115 may comprise any type of cable including, for example, Category 5, Category 5e, and Category 6 (e.g., 6a) cable. Category 5 may comprise a twisted pair cable for carrying signals. Each twisted pair in a Category 5 cable may have differing precise numbers of twists per unit length to minimize crosstalk between the pair. Although cable assemblies containing 4 pair may be used, Category 5 is not limited to just four pair. For example, backbone applications may involve using up to 100 pair. This use of balanced lines may help preserve a high signal-to-noise ratio despite interference from both external sources and crosstalk from other pair. The Category 5e specification may improve upon the Category 5 specification by tightening some crosstalk specifications and introducing new crosstalk specifications that were not present in the original Category 5 specification. Compared with Category 5 and Category 5e, Category 6 may features even more stringent specifications for crosstalk and system noise.

In addition to carrying data between local device 105 and remote device 110, cable 115 may provide electrical power from local device 105 (UPoE power source equipment) to remote device 110 (UPoE powered device). Consequently, cable 105 may provide both data and electrical power.

Figure 2:
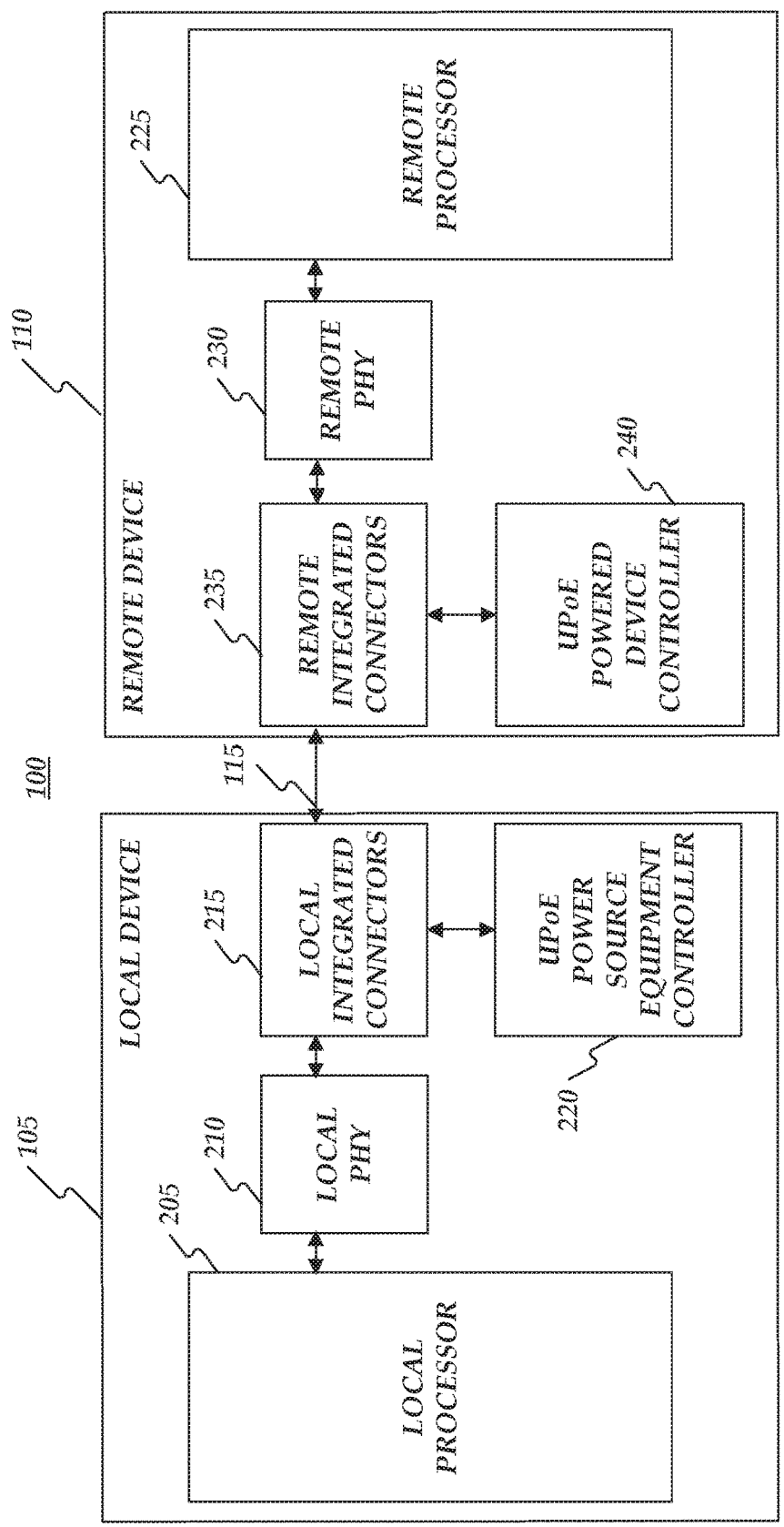
FIG. 2 is a block diagram of a communications system.

FIG. 2 shows communications system 100 in more detail. As shown in FIG. 2, local device 105 may comprise a local processor 205, a local physical layer (PHY) circuit 210, local integrated connectors 215, and a UPoE power source equipment controller 220. Remote device 110 may comprise a remote processor 225, a remote PHY circuit 230, remote integrated connectors 235, and a UPoE powered device controller 240.

Local processor 205 and remote processor 225 may each comprise an application-specific integrated circuit (ASIC). An ASIC may comprise an integrated circuit (IC) customized for a particular use, rather than intended for general-purpose use. Moreover, local processor 205 and remote processor 225 may each comprise a central processing unit (CPU). A CPU may comprise a hardware chip within a computer that carries out instructions of a computer program by performing basic arithmetical, logical, and input/output operations.

Local PHY circuit 210 and remote PHY circuit 230 may each comprise PHY circuits. A PHY circuit may connect a link layer device (e.g., a Media Access Control, or MAC address) to a physical medium such as an optical fiber or copper cable (e.g., cable 115). A PHY circuit may include a Physical Coding Sublayer (PCS) and a Physical Medium Dependent (PMD) layer. The PCS may encode and decode the data that is transmitted and received. The purpose of the encoding may be to make it easier for the receiver to recover the signal.

Local integrated connectors 215 and remote integrated connectors 235 may each comprise integrated connectors. Integrated connectors may be used to interface a device (e.g., local device 105 or remote device 110) to the world outside the device. When constructing the device, an Electromagnetic Interference (EMI) containment feature called a "Faraday Cage" may be designed into the device. A Faraday Cage may comprise an enclosure formed by conducting material or by a mesh of conducting material. This enclosure may block external static and non-static electric fields. Consequently, a Faraday Cage may comprise an approximation to an ideal hollow conductor. Externally or internally applied electromagnetic fields produce forces on charge carriers (i.e., electrons) within the ideal hollow conductor. The charges are redistributed accordingly (e.g., electric currents may be generated). Once the charges have been redistributed so as to cancel the applied electromagnetic field inside, the currents stop.

Local device 105 may comprise UPoE power source equipment used to supply power from local device 105 over cable 115. UPoE power source equipment controller 220 may control the power supplied from local device 105. Remote device 110 may comprise a UPoE powered device. In other words, remote device 110 may receive both data and electrical power from cable 115. UPoE powered device controller 240 may control the power received over cable 115 (e.g., from local device 105).

Figure 3:
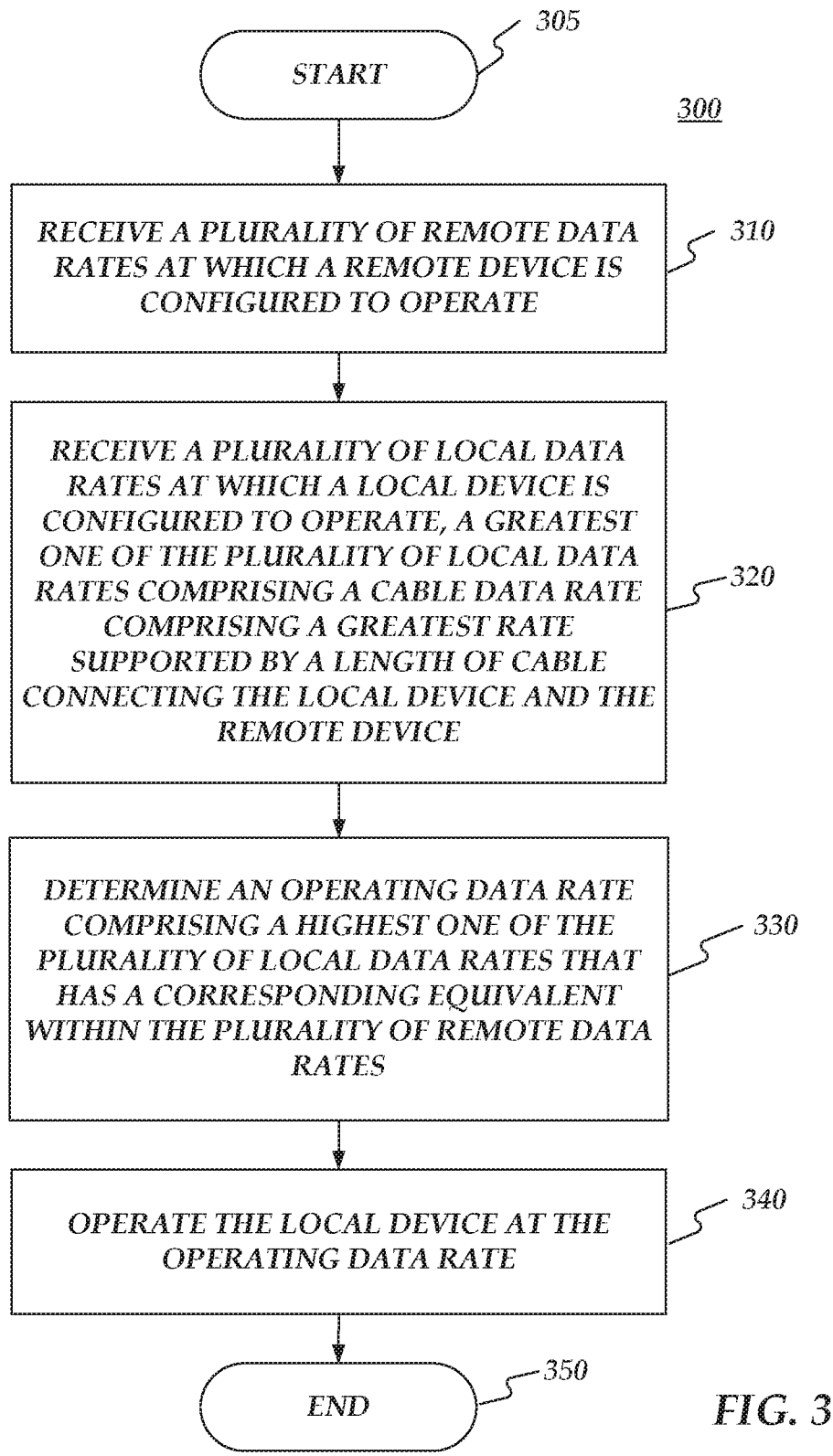
FIG. 3 is a flow chart of a method for providing adjustable data rate data communications.

FIG. 3 is a flow chart setting forth the general stages involved in a method 300 consistent with an embodiment of the disclosure for providing adjustable data rate data communications. Method 300 may be implemented using local device 105 as described in more detail above with respect to FIG. 1 and FIG. 2. Ways to implement the stages of method 300 will be described in greater detail below.

Figure 4A:
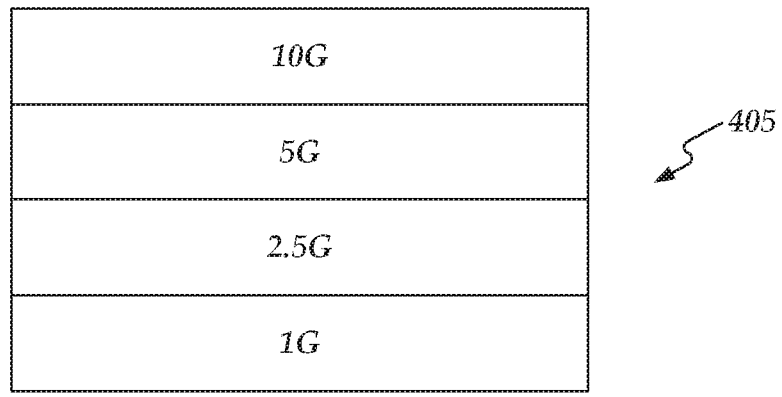
FIG. 4A shows a remote rate table.

Method 300 may begin at starting block 305 and proceed to stage 310 where local device 105 may receive a plurality of remote data rates at which remote device 110 may be configured to operate. For example, remote PHY 230 may transmit to local PHY 210, over cable 115, a remote rate table 405 as shown in FIG. 4A. Remote rate table 405 may include the plurality of remote data rates at which remote device 110 may be configured to operate. As shown in FIG. 4A, remote device 110 may be configured to operate at 10G, 5G, 2.5G, 1G, and 100M. Remote device 110 may operate at other rates and is not limited to the aforementioned rates.

Figure 4B:
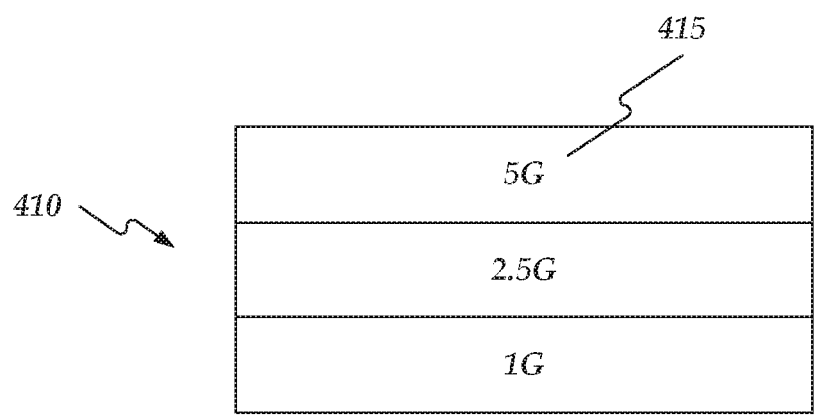
FIG. 4B shows a local rate table.

From stage 310, where local device 105 receives the plurality of remote data rates at which remote device 110 may be configured to operate, method 300 may advance to stage 320 where local device 105 may receive a plurality of local data rates at which local device 105 may be configured to operate. For example, local processor 205 may transmit to local PHY 210 a local rate table 410 as shown in FIG. 4B. Local rate table 410 may include the plurality of local data rates at which local device 105 may be configured to operate. As shown in FIG. 4B, local device 105 may be configured to operate at 5G, 2.5G, and 1G. Local device 105 may operate at other rates and is not limited to the aforementioned rates.

While both local device 105 and remote device 110 may be designed to operate up to and including 10G, the cabling infrastructure (e.g., cable 115) between local device 105 and remote device 110 may not support 10G. However, cable 115 may support a cable data rate less than 10G, but greater than 1G. The cable data rate may comprise a greatest data rate supported by a length of cable 115 connecting local device 105 and remote device 110. For example, Category 5e cables that may not support 10G data rates at 100 m cable lengths, but may support 10G at less than 100 m. Consequently, for Category 5e cable lengths up to 100 m inclusively, a 10G cable data rate may not be supported.

Consistent with embodiments of the disclosure, Category 5e cable lengths between up to 100 m inclusively may support cable data rates between 10G and 1 G. For example, Category 5e cable lengths up to 100 m inclusively may support 5G or 2.5G cable data rates. While Category 5e may be specified to 100 MHz bandwidth, cable characterization measurement may shows Category 5e may support 200 MHz and 400 Msymbol/sec. Adjusting a reference clock in local device 105 to support 2.5G and 5G, for example, may results in reducing bandwidth to 100 MHz/200 MHz respectively. Consequently, embodiments of the disclosure may provide data rates such as 2.5G and 5G over 100 m of Category 5e cable. In other words, for cable lengths up to 100 m, embodiments of the disclosure may provide data rates between 1G and 10G (e.g., 2.5G and 5G) and may not limit the data rates to 1G.

An operator may know, for example, that cable 115 is Category 5e and is between 0 m and 100 m inclusively in length. If cable 115 is Category 5e and is between 0 m and 100 m inclusively in length, the cable data rate may be set between 10G and 1G (e.g., 5G or 2.5G). Consequently, a greatest one of the plurality of local data rates 415 in local rate table 410 may be set at the cable data rate. For example, as shown in FIG. 4B, the cable data rate may comprise 5G. In this example, even though local device 105 may actually support higher data rates, the greatest data rate supported may be set in local rate table 410 to a lower rate comprising the cable data rate.

Once local device 105 receives the plurality of local data rates at which local device 105 is configured to operate in stage 320, method 300 may continue to stage 330 where local device 105 may determine an operating data rate comprising a highest one of the plurality of local data rates that has a corresponding equivalent within the plurality of remote data rates. For example, local PHY 210 may parse local rate table 410 to determine the greatest value in local rate table 410. In the example shown in FIG. 4B, local PHY 210 may parse local rate table 410 to determine the greatest value in local rate table 410 to be 5G. Then local PHY 210 may parse remote rate table 405 to determine if remote rate table 405 has a corresponding equivalent value in it. If remote rate table 405 does have a corresponding equivalent value in it, then this value becomes the operating data rate. If remote rate table 405 does not have a corresponding equivalent value in it, then local PHY 210 may parse local rate table 410 again to determine the next greatest value in local rate table 410 and repeat the process until it finds a corresponding equivalent value in remote rate table 405. In the example shown in FIG. 4A and FIG. 4B, because the greatest value in local rate table 410 is 5G and because there is a corresponding equivalent 5G value within remote rate table 405, local PHY 210 may set the operating data rate to 5G.

After local device 105 determines the operating data rate comprising a highest one of the plurality of local data rates that has a corresponding equivalent within the plurality of remote data rates in stage 330, method 300 may proceed to stage 340 where local device 105 may operate at the operating data rate. For example, while both local device 105 and remote device 110 may be designed to operate at 10G, the cabling infrastructure (e.g., cable 115) between local device 105 and remote device 110 may not support 10G, but may support a value greater than 1 G. Consequently, local device 105 may be operated and may communicate with remote device 110 at 5G because cable 115 may support this rate. Once local device 105 operates at the operating data rate in stage 340, method 300 may then end at stage 350.

Consistent with embodiments of the disclosure, an error rate for communications between local device 105 and remote device 110 may be tested. If the tested error rate is higher than a predetermined level, the operating data rate may be adjusted downward. For example, the operating data rate may be adjusted downward to a second highest one of the plurality of local data rates that has a corresponding equivalent within the plurality of remote data rates. For the example shown in FIG. 4A and FIG. 4B, the operating data rate may be adjusted downward to 2.5G.

Consistent with embodiments of the disclosure, data auto-negotiation may be performed between, for example, local processor 205 and local PHY 210 (or remote PHY 230 and remote processor 225) via messages while maintaining the same clock and maintaining the same link speed (SERDES speed). Consequently, embodiments of the disclosure may provide a mechanism for multi-Gig communication between ASIC and PHY using standard XFI speed (e.g. 10G), but by replicating and sampling data words to match the multi-Gig data rate. In other words, auto-negotiations between PHY and processor may set the data rate between local device 105 and remote device 110 to a rate lower than the link rate (SerDes), but for all other communications, standard XFI may be observed.

Figure 5:
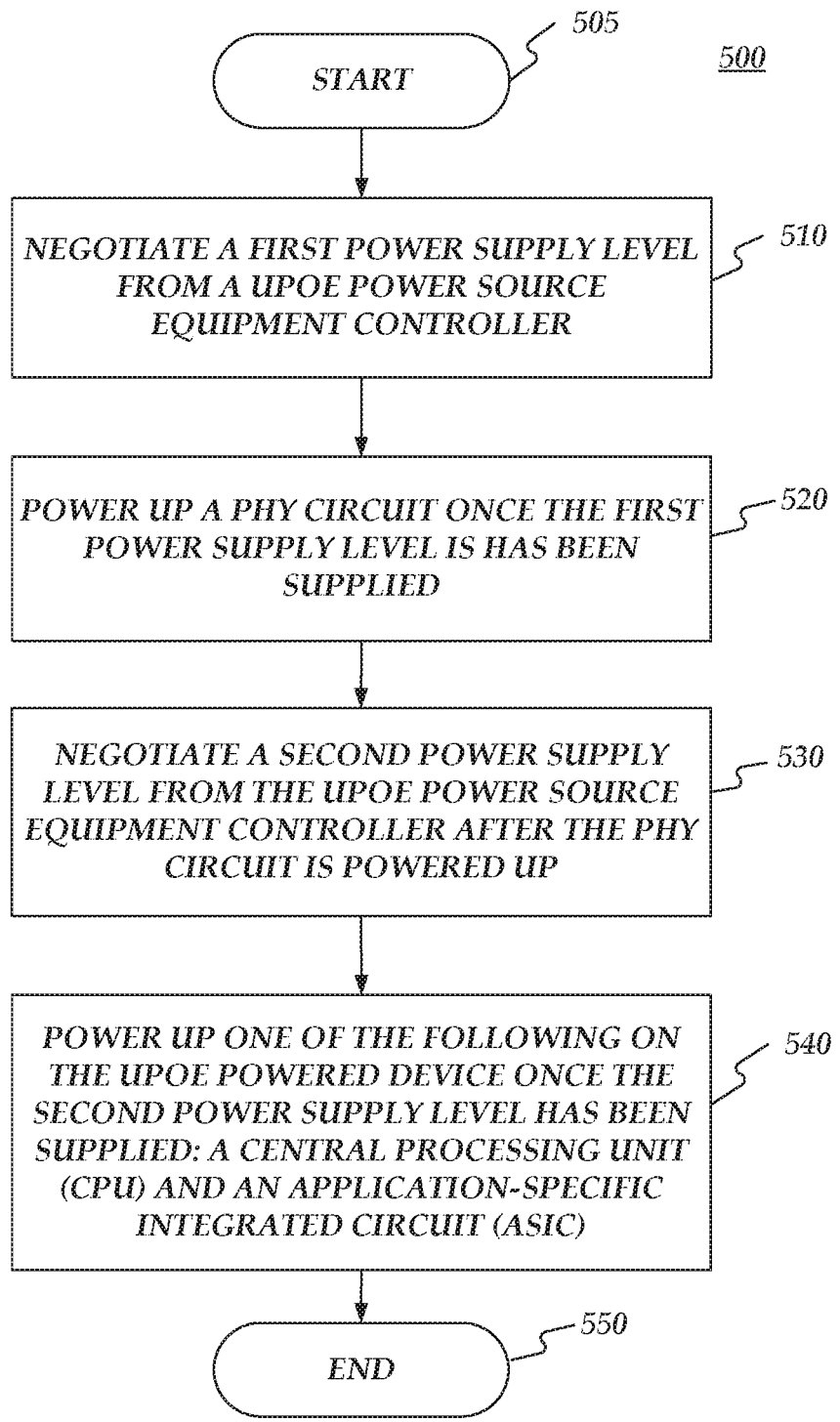
FIG. 5 is a flow chart of a method for providing power to a communications device.

FIG. 5 is a flow chart setting forth the general stages involved in a method 500 consistent with an embodiment of the disclosure for providing power to a communications device. Method 500 may be implemented using communications system 100 as described in more detail above with respect to FIG. 1 and FIG. 2. Ways to implement the stages of method 500 will be described in greater detail below.

Method 500 may begin at starting block 505 and proceed to stage 510 where UPoE powered device controller 240 may negotiate a first power supply level from UPoE power source equipment controller 220. For example, local device 105 may include UPoE power source equipment in order to supply power over cable 115 to remote device 110 that may comprise a UPoE powered device. In order to receive power from local device 105, UPoE powered device controller 240 may communicate with UPoE power source equipment controller 220 and request power at the first power supply level. The first power supply level may comprise, but is not limited to 12.5 W or 12.95 W. The first power supply level may comprise enough power to power up remote PHY 230, but not enough to power remote processor 225.

From stage 510, where UPoE powered device controller 240 negotiates the first power supply level from UPoE power source equipment controller 220, method 500 may advance to stage 520 where UPoE powered device controller 240 may power up remote PHY circuit 230 once the first power supply level has been supplied. For example, UPoE powered device controller 240 may monitor cable 115. Once UPoE powered device controller 240 determines that local device 105 has supplied power on cable 115 to remote device 110 at the first level, UPoE powered device controller 240 may cause remote PHY 230 to power up.

Once UPoE powered device controller 240 powers up remote PHY circuit 230 once the first power supply level has been supplied in stage 520, method 500 may continue to stage 530 where remote PHY circuit 230 may negotiate a second power supply level from UPoE power source equipment controller 220 after remote PHY circuit 230 is powered up. The second power supply level may be greater than the first power supply level. For example, remote PHY circuit 230 may communicate with UPoE power source equipment controller 220 and ask for the power supplied from local device 105 over cable 115 to be stepped up from the first power supply level power to the second power supply level. The second power supply level may be enough to power remote processor 225.

After remote PHY circuit 230 negotiates the second power supply level from UPoE power source equipment controller 220 after remote PHY circuit 230 is powered up in stage 530, method 500 may proceed to stage 540 where remote PHY circuit 230 may power up remote processor 225. For example, remote PHY circuit 230 may monitor cable 115. Once remote PHY circuit 230 determines that local device 105 has supplied power on cable 115 to remote device 110 at the second level, remote PHY circuit 230 may cause remote processor 225 to power up. Once remote PHY circuit 230 powers up remote processor 225 in stage 540, method 500 may then end at stage 550.

An embodiment consistent with the disclosure may comprise a system for providing adjustable data rate data communications. The system may comprise a local device. The local device may be operative to receive a plurality of remote data rates at which a remote device is configured to operate. In addition, the remote device may be operative to receive a plurality of local data rates at which the local device is configured to operate. A greatest one of the plurality of local data rates may comprise a cable data rate comprising a greatest rate supported by a length of cable connecting the local device and the remote device. The remote device may be further operative to determine an operating data rate comprising a highest one of the plurality of local data rates that has a corresponding equivalent within the plurality of remote data rates and operate at the operating data rate.

Another embodiment consistent with the disclosure may comprise a system for providing adjustable data rate data communications. The system may comprise a cable comprising Category 5e and having a length between approximately 0 m and approximately 100 m inclusively. The cable may have a first end and a second end. The system may further comprise a remote device connected to the first end of the cable and a local device connected to the second end of the cable. The local device may be configured to receive, from the remote device, a plurality of remote data rates at which the remote device is configured to operate. The local device may be further configured to determine an operating data rate for the local device. The operating data rate may comprise a highest one of a plurality of local data rates that has a corresponding equivalent within the plurality of remote data rates. A greatest one of the plurality of local data rates may comprise a cable data rate comprising a greatest rate supported by the cable. The local device may be further configured to operate at the operating data rate.

Yet another embodiment consistent with the disclosure may comprise a system for providing power to a communications device. The system may comprise a physical layer (PHY) circuit on a universal power over Ethernet (UPoE) powered device and a UPoE powered device controller on the UPoE powered device. The UPoE powered device controller may be configured to negotiate a first power supply level from a UPoE power source equipment controller on a UPoE power source device and to power up the PHY circuit once the first power supply level is has been supplied. The PHY circuit may be configured to negotiate a second power supply level from the UPoE power source equipment controller after the PHY circuit is powered up. The second power supply level may be greater than the first power supply level. The PHY circuit may be further configured to power up one of the following on the UPoE powered device once the second power supply level has been supplied: a central processing unit (CPU) and an application-specific integrated circuit (ASIC).

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
a physical layer (PHY) circuit on a universal power over Ethernet (UPoE) powered device; and
a UPoE powered device controller on the UPoE powered device,
wherein the UPoE powered device controller is configured to,
negotiate a first power supply level from a UPoE power source equipment controller on a UPoE power source device, wherein the UPoE power source device is remote from the apparatus and is connected to the apparatus though a cable operable to transfer data between the UPoE power source device and the apparatus, and wherein the cable is further operable to provide electrical power from the UPoE power source device to the apparatus, and
power up the PHY circuit once the first power supply level is supplied on the cable; and
wherein the PHY circuit is configured to,
negotiate a second power supply level on the cable from the UPoE power source equipment controller after the PHY circuit is powered up with the first power supply level, the second power supply level being greater than the first power supply level, and
power up one of the following on the UPoE powered device using the second power supply level once the second power supply level has been supplied on the cable: a central processing unit (CPU) and an application-specific integrated circuit (ASIC).

2. The apparatus of claim 1, wherein the first power supply level is one of approximately 12.5 W and approximately 12.95 W.

3. The apparatus of claim 2, wherein the apparatus comprises one of the following: a network switch and a router.

4. A method comprising:
negotiating, by a UPoE powered device controller on a UPoE powered device, a first power supply level from a UPoE power source equipment controller on a UPoE power source device, wherein the UPoE power source device is remote from the apparatus and is connected to the apparatus though a cable operable to transfer data between the UPoE power source device and the apparatus, and wherein the cable is further operable to provide electrical power from the UPoE power source device to the apparatus;
powering up, by a UPoE powered device controller, a PHY circuit once the first power supply level is supplied on the cable;
negotiating, by the PHY circuit, a second power supply level on the cable from the UPoE power source equipment controller after the PHY circuit is powered up with the first power supply level, the second power supply level being greater than the first power supply level; and
powering up, by the PHY circuit, one of the following on the UPoE powered device using the second power supply level once the second power supply level has been supplied on the cable: a central processing unit (CPU) and an application-specific integrated circuit (ASIC).

5. The method of claim 4, wherein negotiating the first power supply level comprises negotiating the first power supply level comprising one of the following: approximately 12.5 W and approximately 12.95 W.

6. The method of claim 5, wherein negotiating, by the UPoE powered device controller on the UPoE powered device, comprises negotiating, by the UPoE powered device disposed in an apparatus comprising one of the following: a network switch and a router.

7. The apparatus of claim 1, wherein the cable comprises a Category 5e cable.

8. The apparatus of claim 1, wherein the cable is over 100 meters carrying the data at a data rate of approximately 2.5 Gigabit.

9. The apparatus of claim 1, wherein the PHY circuit is connected to and from the application-specific integrated circuit (ASIC), and wherein multi-gigabit data rates are supported by the PHY circuit.

10. The apparatus of claim 9, wherein the PHY circuit is connected to and from the ASIC through a fast auto-negotiation process to determine an appropriate data rate.

11. The apparatus of claim 9, wherein a Serial Gigabit Media Independent Interface (SGMII) protocol is used to accommodate the multi-gigabit rates.

12. The apparatus of claim 11, wherein the SGMII protocol is coded to carry data at a plurality of the following Ethernet data rates: 10 Megabit, 100 Megabit, 1 Gigabit, 2.5 Gigabit, 5 Gigabit, and 10 Gigabit.

13. The method of claim 4, wherein powering up, by the UPoE powered device controller, the PHY circuit comprises:
monitoring the monitor cable; and
causing, upon determining that the UPoE power source device has supplied power on the cable at the first supply level power, by the UPoE powered device controller, the PHY circuit to power up.

14. The method of claim 4, wherein negotiating, by the PHY circuit, the second power supply level from the UPoE power source equipment controller comprises:
communicating, by the PHY circuit with the UPoE power source equipment controller; and
requesting for the power supplied from the UPoE power source device over the cable to be stepped up from the first power supply level power to the second power supply level.

15. The method of claim 4, wherein the PHY circuit is connected to and from the application-specific integrated circuit (ASIC), and wherein multi-gigabit data rates are supported by the PHY circuit.

16. The method of claim 15, wherein the PHY circuit is connected to and from the ASIC through a fast auto-negotiation process to determine an appropriate data rate.

17. The method of claim 15, wherein a Serial Gigabit Media Independent Interface (SGMII) protocol is used to accommodate the multi-gigabit rates.

* * * * *